H. MOTE.
DEMOUNTABLE AND SEPARABLE VEHICLE WHEEL RIM.
APPLICATION FILED MAR. 13, 1913.

1,264,542.

Patented Apr. 30, 1918.
3 SHEETS—SHEET 1.

Witnesses:
F. Griswold
E. M. Nickels

Inventor
Horace Mote
by
Attorney

H. MOTE.
DEMOUNTABLE AND SEPARABLE VEHICLE WHEEL RIM.
APPLICATION FILED MAR. 13, 1913.

1,264,542.

Patented Apr. 30, 1918.
3 SHEETS—SHEET 2.

Witnesses
F. Griswold
E. M. Nickels

Inventor
Horace Mote
by H. Q. Lawrence
Attorney

UNITED STATES PATENT OFFICE.

HORACE MOTE, OF DETROIT, MICHIGAN.

DEMOUNTABLE AND SEPARABLE VEHICLE-WHEEL RIM.

1,264,542.   Specification of Letters Patent.   Patented Apr. 30, 1918.

Application filed March 13, 1913. Serial No. 756,611.

*To all whom it may concern:*

Be it known that I, HORACE MOTE, a subject of the King of England, residing at Detroit, in the county of Wayne and State of Michigan, have invented certain new and useful Improvements in Demountable and Separable Vehicle-Wheel Rims, of which the following is a specification.

My invention relates to improvements in demountable and separable vehicle wheel rims, and has for its object, the provision of a simple, strong and efficient rim, for mounting pneumatic tires, which shall also be economically manufactured and readily handled by the user.

In my improved construction, I have availed of the force exerted by the inflated tire, for materially aiding in retaining the rim upon the vehicle wheel. The wheel itself, preferably is strengthened by a channeled felly-band, which also accommodates auxiliary locking mechanism. Furthermore, I have provided a rim, comprising simply a rolled annular base-portion, transversely split and suitably shaped, to receive two rings or removable flange-members, which are adapted securely to hold the base of any desired type of tire. This base portion is itself peripherally flanged to retain said rings, and interiorly rolled with circumferential grooves for engaging the channeled felly-band.

Further details of construction, may best be explained, by referring to the accompanying sheets of drawings, wherein:—

Figure 4:
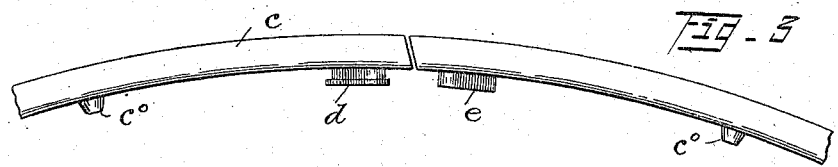

Fig. 4, a fragmentary side view of the split ends of the rim, together with the positioning lugs, and a portion of the locking mechanism.

Figure 5:
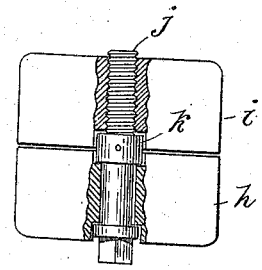
Figure 6:
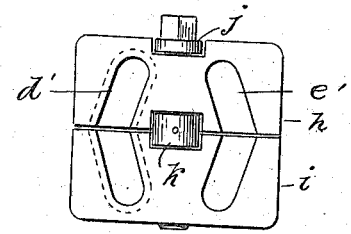
Figure 8:
Figure 9:
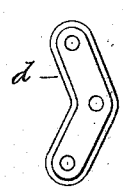
Figure 10:
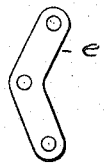
Figure 11:

Figs. 5, 6, and 7 respectively, are bottom, top and side views of the separable locking means; the former being partially in section, better to indicate the action of the screw.

Figs. 8 and 9, and Figs. 11 and 10 respectively, are side and plan views of the stationary locking means, which are secured adjacent to the split ends of the rim.

Figure 12:
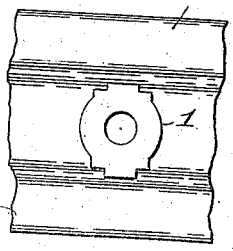

Fig. 12, is a detail of the reinforced rim section, accommodating the valve stem.

Figure 13:
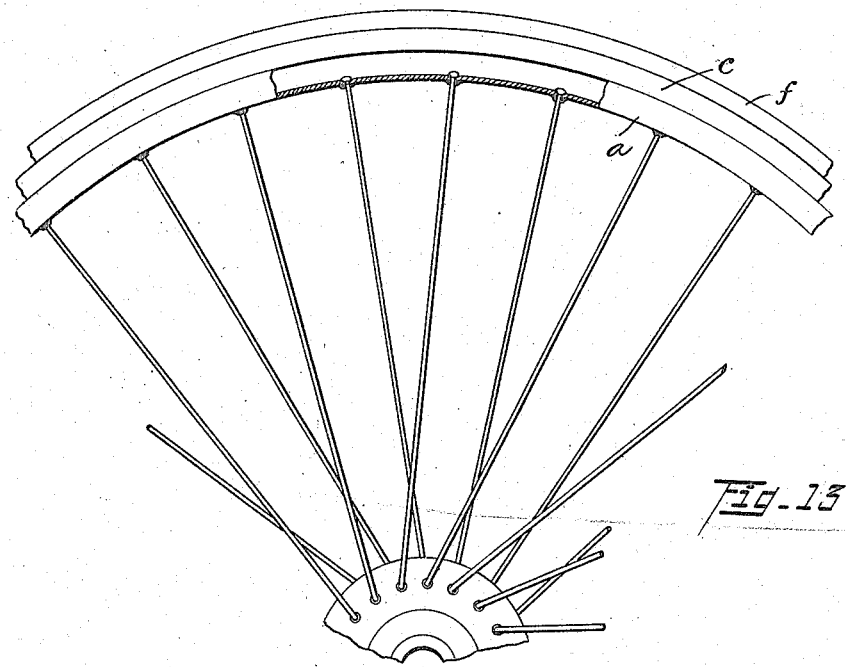
Figure 14:
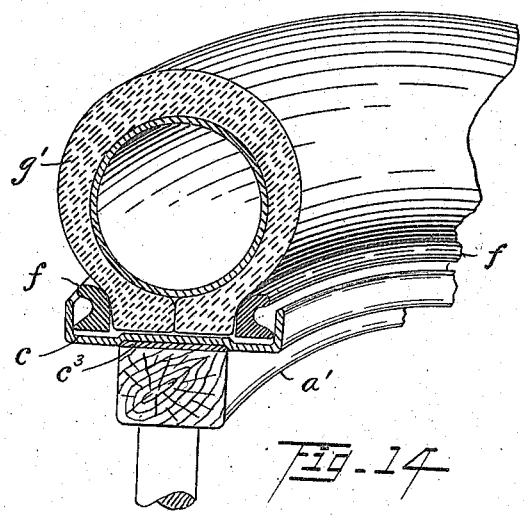
Figure 15:
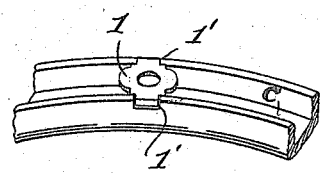

Fig. 13 is a fragmentary view, partially broken away, illustrating my improvements applied to a wire-spoked wheel. Fig. 14 is a transverse sectional view and fragmentary isometric projection of a rim of my invention, mounting a non-clencher tire, and Fig. 15 is a detail showing the means for securing the base portion and valve stem against rotation.

Throughout the several figures of the drawings, I have employed the same character of reference to indicate similar parts.

Three separable members comprise the rim proper; two of which are reversible rings or flange members, which are normally held by a flanged channeled base portion, when the rim and tire are adjusted upon the wheel. Said wheel preferably is provided with a channeled felly band, substantially U-shaped in cross section, whereon the base portion is adapted to be contracted, both by the inflation of the tire, and screw acting or other suitable means, which are adapted both to expand and contract said base portion, for the purpose of removing it from, and adjusting the same upon the wheel.

Figure 1:
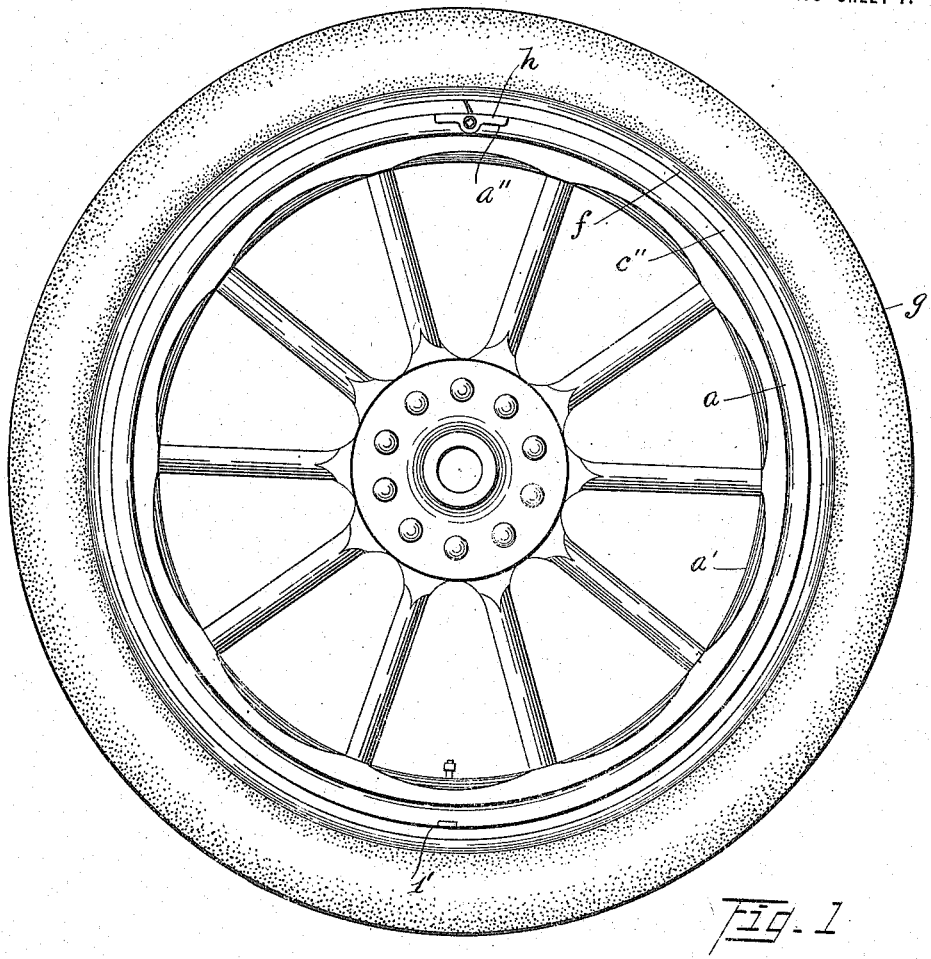
Figure 1, is a view in side elevation of a vehicle wheel, fitted with my improved rim, which in turn mounts a clencher type of pneumatic tire.
Figure 2:
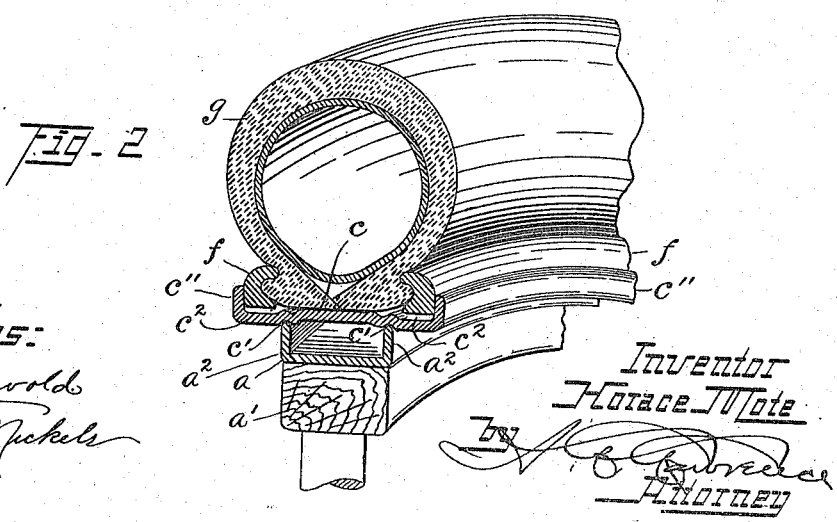
Fig. 2, is an enlarged cross sectional view, and fragmentary isometric projection of the felly, rim and tire.
Figure 3:
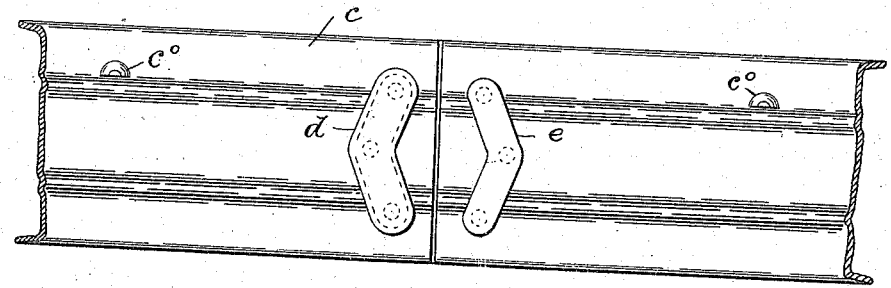
Fig. 3, is a fragmentary under-side view.

In Fig. 1, I have shown the complete structure as assembled for use, but an inspection of Fig. 2, will more readily enable one to appreciate the features of my improvement, and the immediately ensuing description relates more particularly to the latter figure. The channeled felly band $a$, is mounted upon the wheel $a'$; being cut away laterally at one portion ($a''$) to accommodate the locking and expanding mechanism, as will be later explained. This type of felly band, not only serves to accommodate said locking mechanism, but materially strengthens the wheel, and renders it more rigid than the ordinary flat felly band. More important still, the two up-standing circumferential edges $a^2$ of said felly band afford duplicate retaining members for a suitably shaped contractile rim. In the structure shown, the base portion $c$ of said rim, is rolled from sheet metal, to provide a split annulus, as best shown in Figs. 3 and 4, the ends thereof being provided with screw-acting means, for causing said rim members to expand or contract, and lugs $c^0$ for engaging one side of the felly band. Two angularly shaped abutments $d\ e$ are secured adjacent to the split ends of the rim, and comprise stationary members for the expanding and contracting mechanism.

Two continuous retaining-rings $f$ are assembled upon the base portion of the rim for engaging the base of tire $g$, and retaining it in position upon the wheel. These in turn are retained by integral, straight-sided outer flanges $c''$, which are rolled at either side of the rim member. In order to accommodate said rings and the felly band, respectively, said base portion $c$ is annularly rolled to afford two shallow interior grooves $c'$, spaced at a distance corresponding to the up-turned edges of the felly band, as best shown in Fig. 2. There results from the described construction, two lateral peripheral channels $c^2$, within the base portion, which are adapted to accommodate the rings $f$; these being of slightly greater internal diameter than the normal external diameter of the base portion measured at the channels $c^2$. The rings $f$ preferably are of a type which may be reversed or interchanged to accommodate either the clencher or non-clencher type of tire, as is well known in the art.

The abutments $d\ e$; the former of which is flanged to retain the screw acting mechanism, respectively present double inclined or wedging surfaces for the action of the latter. Details thereof are well shown in Figs. 5, 6, and 7. This comprises two laterally separable members $h\ i$; the latter of which is tapped to receive the transverse shouldered screw $j$, extending through the central bores in member $h$, and in the spacing sleeve $k$. The head of said screw is squared to accommodate a wrench or other tool for operating the locking and expanding mechanism. Two diagonal converging slots $d'\ e'$; the former of which is under-cut, as indicated by dotted lines in Fig. 6, are provided in the members $h\ i$, and are adapted respectively to receive angularly shaped abutments $d\ e$. When adjusted thereon, abutment $d$ serves to hold the screw mechanism in position upon the base portion of the rim, while abutment $e$ may readily be separated therefrom by withdrawing it from the slot $e'$. This unitary interior screw-acting mechanism, except in detailed combination, is not sought to be protected herein, as the general features thereof are claimed in my co-pending application, Ser. No. 717,063, filed Aug. 26th, 1912.

In order to position the rim accurately upon its wheel-periphery $c$, which is approximately U-shaped in cross-section, I have provided interiorly thereof, a shouldered member 1, through which the valve stem of the tire protrudes, which member is adapted to engage the cut-away or notched portion 1' of the felly, and against which the locking mechanism may act in drawing the base portion of the rim to its seat about the member $a$. Accordingly, said mechanism is brought into accurate register, with the cut-away portion of the channeled wheel-periphery, wherein it fits, as shown in Figs. 1 and 15. It is apparent that when the rim is closely seated about the wheel-periphery, there will be no possible independent movement thereof, either in lateral or circumferential directions.

Referring to Fig. 13, an advantage of my improved rim will be apparent, as applied to wire-spoked vehicle wheels. The channeled felly band $a$, serves also as the felly in this construction, wherein the wire-spokes are seated within the base of the channel, and the split rim $c$ is mounted directly upon said wheel-periphery. The channel affords the necessary rigidity for the wheel structure, while providing space for the screw-acting mechanism as above explained, and affording the continuous circumferential ribs for retaining said rim in position.

A slightly modified construction is shown in Fig. 14, wherein a non-clencher type of tire $g'$ is mounted upon my improved rim with the rings $f$ thereof reversed in position to engage the base of said tire. The wheel $a'$ is provided with the ordinary flat felly band, while the base portion $c$ of the rim is interiorly shaped to provide a single channel or groove $c^3$ for engaging the wheel and its flat felly band.

It will be seen that in the several types of wheel to which my invention is applied, the fixed-rim of the wheel itself, as I may term it, or the wheel-periphery, is engaged by the split demountable rim, when the latter is contracted for securing the tire in place.

The operation of my improved demountable rim may now be explained, and will be easily understood. The annular base portion is first contracted in circumference, by overlapping the severed ends sufficiently to permit one of the retaining rings $f$ to be slipped into place. The tire $g$ is then mounted upon the rim, and the second or outer retaining ring $f$ is placed in position laterally thereof. After inserting abutment $e$ within the slot $e'$ of the locking and expanding mechanism, thereby bringing the ends of the rim member $c$ into alinement, the tire may be inflated to the extent desired, and by turning screw $k$, said member $c$ may be expanded sufficiently to clear the felly and felly band. Shouldered-member 1 is then inserted within the notch 1' of the felly band, and the rim may be readily slipped into position with the lugs $c^0$ in engagement with the outer flange $a^2$. Relaxing the screw-acting mechanism, will then permit the rim to contract firmly about the felly band with the respective grooves and ribs in engagement, and a few turns of said screw $k$ will lock the base portion against removal therefrom, while the air-pressure of the inflated tire acts circumferentially of said base portion, to hold it in position.

My improved rim is seen to comprise two rings of fixed diameter, such as will accommodate and conform to the beads or base portion of a pneumatic tire, thereby serving as separable flanges upon the rim. These are employed in conjunction with a flanged rim-member or split base portion of variable circumference, which may be contracted to receive the rings and tire, then expanded to fit over the felly of the wheel, and finally contracted to hold the wheel rim and tire in fixed relation. The straight-sided parallel flanges provided upon the demountable rim contribute largely to this function, since they permit the rings to "float" or slide freely within their respective side channels. The base portion thus is free to expand and contract interiorly of the rings, within narrow limits, and without reacting against the beads of the tire.

From the consideration of the construction herein explained, it will be appreciated that while the base of the pneumatic tire is retained between inflexible continuous retaining rings, the inner tread portion bears upon the split rim-member circumferentially thereof, with a pressure directly in proportion to the degree of inflation of the tire. This force is exerted at all points upon the rim member, which is free to contract within the rings, and is thereby seated firmly upon the felly band. Indeed, this contractile force of the pneumatic tire is such that my improved rim may be employed without any locking means whatsoever, for the purpose of holding said rim upon the felly band. Of course, such locking and expanding mechanism is required for retaining the rim in place, should the tire become deflated, and for expanding the rim sufficiently to clear the felly band. Otherwise the contractile effect of the tire might be relied upon for retaining the tire and rim in position upon the wheel.

It is demonstrated by the foregoing, that my improvements admit of various modifications in structure, and that the rim may be mounted directly upon a felly or felly band of varying structure. I accordingly claim the following herein, as my invention:—

1. In a device of the class described, the combination with a wheel and its fixed-rim; the latter affording a plurality of annular ribs circumferential of the wheel, of a demountable tire and a supporting rim therefor, comprising two endless retaining rings, and a split annular base portion interiorly recessed to accommodate the annular ribs, and adapted to be contracted over said fixed-rim and ribs, and two laterally positioned annular channels adapted to accommodate the retaining rings, substantially as set forth.

2. In a demountable and separable rim for vehicle wheels, a laterally split base portion shaped to provide a plurality of interior channels, and two lateral exterior flanges, of two retaining-rings adapted to be respectively engaged by said flanges, screw acting mechanism for expanding the base portion, and an exteriorly channeled fixed-rim conforming to the interiorly channeled base-portion, substantially as set forth.

3. In a device of the class described, the combination with a wheel and its fixed-rim, of a demountable tire and rim therefor; the latter comprising two endless retaining-rings and a transversely split rolled annular base-portion having an interior channel adapted to be contracted to fit over said fixed-rim and two exterior, laterally-positioned straight-sided channels adapted to accommodate the retaining rings, substantially as set forth.

4. In a vehicle wheel rim of the class described, the combination with a pneumatic tire, of a rim-member adapted to receive and mount the inflated tire, comprising an integral base-portion shaped to afford an interior annular channel and two lateral annular retaining flanges having parallel straight sides, screw-mechanism adapted to expand said base-portion against the pressure of the inflated tire, and two endless retaining rings secured in place by the annular flanges, and adapted to retain the base of the tire within the rim, substantially as set forth.

5. In a vehicle wheel, the combination with the wheel-member and its fixed-rim having annularly upturned edges and approximately U-shaped in cross section, of a detachable rim-member adapted to receive and mount an inflated tire, comprising a split annular base-portion shaped to afford interior annular grooves adapted to fit upon the fixed-rim, and two peripheral annular channels provided with lateral flanges, two retaining rings respectively fitting within, and slightly larger in diameter than said peripheral channels, respectively secured in place by the flanges, and interiorly-positioned unitary screw-mechanism adapted to expand and contract the base-portion, for the purpose of adjusting and seating the rim upon the fixed-rim, substantially as set forth.

6. The combination with a transversely split annular rim-member, of diagonally extending abutments, respectively positioned adjacent to the separable ends, a locking member provided with diverging slots, respectively engaging said abutments interiorly of the slots, and screw acting means adapted to effect the transverse movement of said locking member with respect to said abutments, substantially as set forth.

7. The combination with a transversely split annular rim-member, of two angularly shaped abutments respectively disposed adjacent to the ends thereof, and expanding and locking means associated therewith, comprising two divergently slotted parts respectively engaging said abutments from either side, and a screw adapted to effect the lateral movement thereof with respect to said abutments, thereby expanding and contracting the rim-member, substantially as set forth.

8. In a device of the class described, the combination with a wheel and its channeled wheel-periphery, of a demountable tire and rim fitting about said wheel-periphery, and laterally-acting wedging means for contracting and expanding said rim, fitting within the channeled wheel-periphery; the latter being cut-away to accommodate said means, substantially as set forth.

9. In a device of the class described, the combination with a wheel and its fixed-rim, of a demountable tire and rim therefor; the latter comprising two endless retaining rings, and a split annular base portion laterally flanged to accommodate the rings, and laterally-acting wedging means for expanding said base portion against the contractile force of the inflated tire, whereby the beads of said tire are retained between inextensible rings, and the inner-tread of the tire is left free to act in contracting the base portion about the fixed-rim, substantially as set forth.

In testimony whereof I do now affix my signature in presence of two witnesses.

HORACE MOTE.

Witnesses:
WILLIAM C. BRACKEN,
ALBERT LYNN LAWRENCE.

Copies of this patent may be obtained for five cents each, by addressing the "Commissioner of Patents, Washington, D. C."